(12) United States Patent
Liu et al.

(10) Patent No.: US 10,565,320 B1
(45) Date of Patent: Feb. 18, 2020

(54) DYNAMIC MULTILINGUAL SPEECH RECOGNITION

(71) Applicant: International Business Machines Corporation, Armonk, NY (US)

(72) Inventors: Su Liu, Austin, TX (US); Inseok Hwang, Austin, TX (US); Eric Rozner, Boulder, CO (US); Chungkuk Yoo, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/145,611

(22) Filed: Sep. 28, 2018

(51) Int. Cl.
*G06F 17/28* (2006.01)
*G06F 17/27* (2006.01)
*G10L 15/22* (2006.01)
*G06F 3/16* (2006.01)
*G06N 20/00* (2019.01)

(52) U.S. Cl.
CPC ............ *G06F 17/289* (2013.01); *G06F 3/167* (2013.01); *G06F 17/275* (2013.01); *G06N 20/00* (2019.01); *G10L 15/22* (2013.01); *G10L 2015/227* (2013.01)

(58) Field of Classification Search
CPC ............ G06F 16/3337; G06F 17/2872; G06F 17/289; G06F 16/30; G06F 17/275; G06F 17/28; G06F 17/2836; G10L 13/047; G10L 13/086; G10L 15/005; G10L 15/063; G10L 15/07; G10L 15/16; G10L 15/187; G10L 15/28; G10L 25/63; G10L 15/06; G10L 15/18; G10L 15/19; G10L 15/197;
(Continued)

(56) References Cited

U.S. PATENT DOCUMENTS 5,999,902 A 12/1999 Scahill et al.
7,562,007 B2 7/2009 Hwang
(Continued)

OTHER PUBLICATIONS

Z. Wang; U. Topkara; T. Schultz; and A. Waibel "Towards Universal Speech Recognition" 2002, Proceedings of the Fourth IEEE International Conference on Multimodal Interfaces (ICMI'02). (Year: 2002).*
(Continued)

*Primary Examiner* — Huyen X Vo
(74) *Attorney, Agent, or Firm* — Heslin Rothenberg Farley & Mesiti P.C.; Noah Sharkan, Esq.

(57) ABSTRACT

A method, computer program product, and a system where a processor(s), monitors multilingual switches performed on a client on behalf of a given user. Based on the monitoring, the processor(s) identifies switch patterns of the given user to generate a service profile for the user of machine learned multilingual switch patterns for the given user. The processor(s) determines a priority order for languages comprising the voice input streams, for the given user. The processor(s) obtains a new translation request initiated by the client, on behalf of the given user and applies the priority order to identify one or more languages spoken in a voice input stream of the new translation request. The processor(s) transmits indicators of the identified one or more languages to the client, where upon receiving the indicators, the client translates the voice input stream from the identified one or more languages to one or more target languages.

20 Claims, 8 Drawing Sheets

(58) Field of Classification Search
CPC ............... G10L 15/26; G10L 2015/025; G10L 2015/0633; G10L 2015/0638; G10L 25/18
See application file for complete search history.

(56) References Cited

U.S. PATENT DOCUMENTS

| | | |
|---|---|---|
| 7,949,517 B2 | 5/2011 | Eckert et al. |
| 8,831,929 B2 | 9/2014 | Hong |
| 9,190,063 B2 | 11/2015 | Bennett et al. |
| 9,411,801 B2 | 8/2016 | Osipova |
| 2006/0206331 A1 | 9/2006 | Hennecke et al. |
| 2018/0089172 A1* | 3/2018 | Needham ............... G06F 17/289 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

Wang et al., "Towards Universal Speech Recognition", ICMI '02 Proceedings of the 4th IEEE International Conference on Multimodal Interfaces, pp. 247-252.

* cited by examiner

| Mixed Group | English | Chinese | Japanese | Korean | Other |
|---|---|---|---|---|---|
| 1. App1 | 0.5 | 0.4 | 0.1 | 0 | 0 |
| 2. App1 + location1 | 0.4 | 0.5 | 0.1 | 0 | 0 |
| 3. App1 + location2 | 0.3 | 0.6 | 0.1 | 0 | 0 |
| 4. App1 + location3 | 0.2 | 0.7 | 0.1 | 0 | 0 |
| 5. App2 | 0 | 0 | 1 | 0 | 0 |
| 6. App2 + location4 | 0.4 | 0.2 | 0.4 | 0 | 0 |
| 7. App2 + location5 | 0.2 | 0.4 | 0.4 | 0 | 0 |
| 8. App2 + location6 | 0.4 | 0 | 0 | 0.6 | 0 |

DYNAMIC MULTILINGUAL SPEECH RECOGNITION

BACKGROUND

When utilizing translation applications, a desirable goal is to achieve translation in real-time. The prevalence of Internet of Things (IoT) devices, many with no traditional input/output hardware, have popularized the use of various applications that utilize audio as an input. After all, utilizing applications that include speech recognition and can accept voice input can reduce the effort users spend on data entry and provide accessibility to users for whom, and users in environments where, manual entry is challenging. For audio entry to be efficient and useful, the workflows must be intuitive and user-friendly. In the case of a translation application utilizing audio as input, as a speaker provides content, one or more programs executing on a processor would provide the translation, in real-time. In order to provide this functionality, the one or more programs would recognize the language of the content to be translated. Existing translation systems are not suited to this workflow because to recognize an input language, these systems require pre-configurations which supply the language of the content, in order to translate the content into a second language. The pre-configurations are required because of the inherent difficulties in recognizing a language of content in real-time (e.g., there are six thousand nine hundred and nine (6,909) distinct languages in the world and the content provided may not be limited to a single language). Provided that the language of content can be recognized, another challenge is determining, on-the-fly, into what language the content should be translated. For example, an intended audience for the translation may include individuals (users, applications, etc.) with different priorities regarding the language of the translated content. Thus, the translation desired may not be apparent if not known (or configured) in advance.

SUMMARY

Shortcomings of the prior art are overcome and additional advantages are provided through the provision of a method for determining an input language in a multilingual audio input stream for translation. The method includes, for instance: monitoring, by one or more processors, multilingual switches performed on a client on behalf of a given user, wherein service requests initiated by the client on behalf of the given user comprise a portion of the multilingual switches, wherein translation requests comprise a portion of the service requests, and wherein the translation requests each comprise a voice input stream and contextual data related to the voice input stream; based on the monitoring, identifying, by the one or more processors, based on the multilingual switches performed on the client, switch patterns of the given user to generate a service profile for the user, wherein the service profile comprises machine learned multilingual switch patterns for the given user; determining, by the one or more processors, based on the machine learned multilingual switch patterns for the given user, a priority order for languages comprising the voice input streams, for the given user; obtaining, by the one or more processors, a new translation request initiated by the client, on behalf of the given user; applying, by the one or more processors, the priority order to identify one or more languages spoken in a voice input stream comprising the new translation request; and transmitting, by the one or more processors, indicators of the identified one or more languages to the client, wherein upon receiving the indicators, the client translates the voice input stream from the identified one or more languages to one or more target languages.

Shortcomings of the prior art are overcome and additional advantages are provided through the provision of a computer program product for determining an input language in a multilingual audio input stream for translation. The computer program product comprises a storage medium readable by a processing circuit and storing instructions for execution by the processing circuit for performing a method. The method includes, for instance: monitoring, by the one or more processors, multilingual switches performed on a client on behalf of a given user, wherein service requests initiated by the client on behalf of the given user comprise a portion of the multilingual switches, wherein translation requests comprise a portion of the service requests, and wherein the translation requests each comprise a voice input stream and contextual data related to the voice input stream; based on the monitoring, identifying, by the one or more processors, based on the multilingual switches performed on the client, switch patterns of the given user to generate a service profile for the user, wherein the service profile comprises machine learned multilingual switch patterns for the given user; determining, by the one or more processors, based on the machine learned multilingual switch patterns for the given user, a priority order for languages comprising the voice input streams, for the given user; obtaining, by the one or more processors, a new translation request initiated by the client, on behalf of the given user; applying, by the one or more processors, the priority order to identify one or more languages spoken in a voice input stream comprising the new translation request; and transmitting, by the one or more processors, indicators of the identified one or more languages to the client, wherein upon receiving the indicators, the client translates the voice input stream from the identified one or more languages to one or more target languages.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4 is an illustration of various aspects of an embodiment of the present invention;

DETAILED DESCRIPTION

Figure 1:
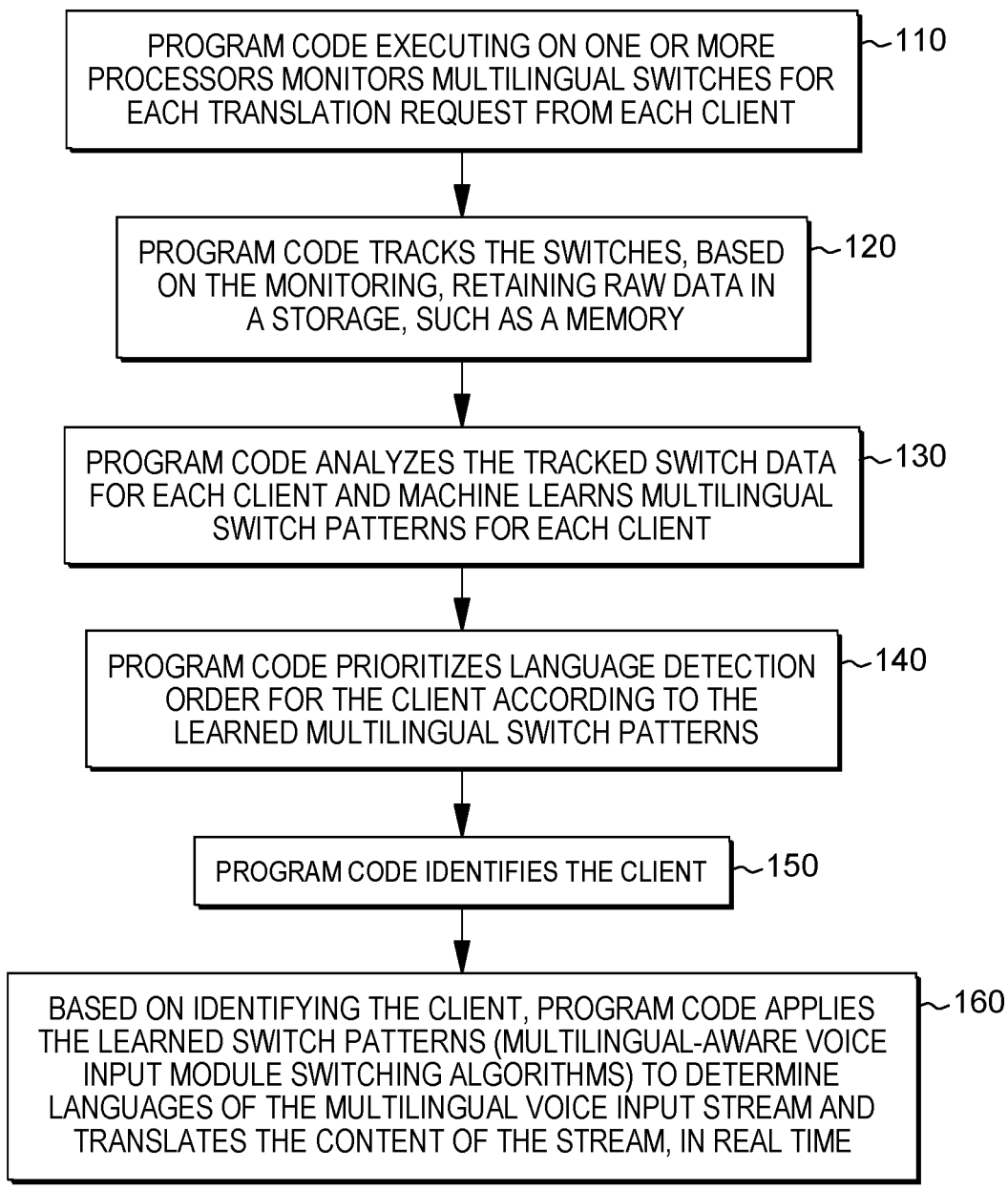
FIG. 1 is a workflow illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
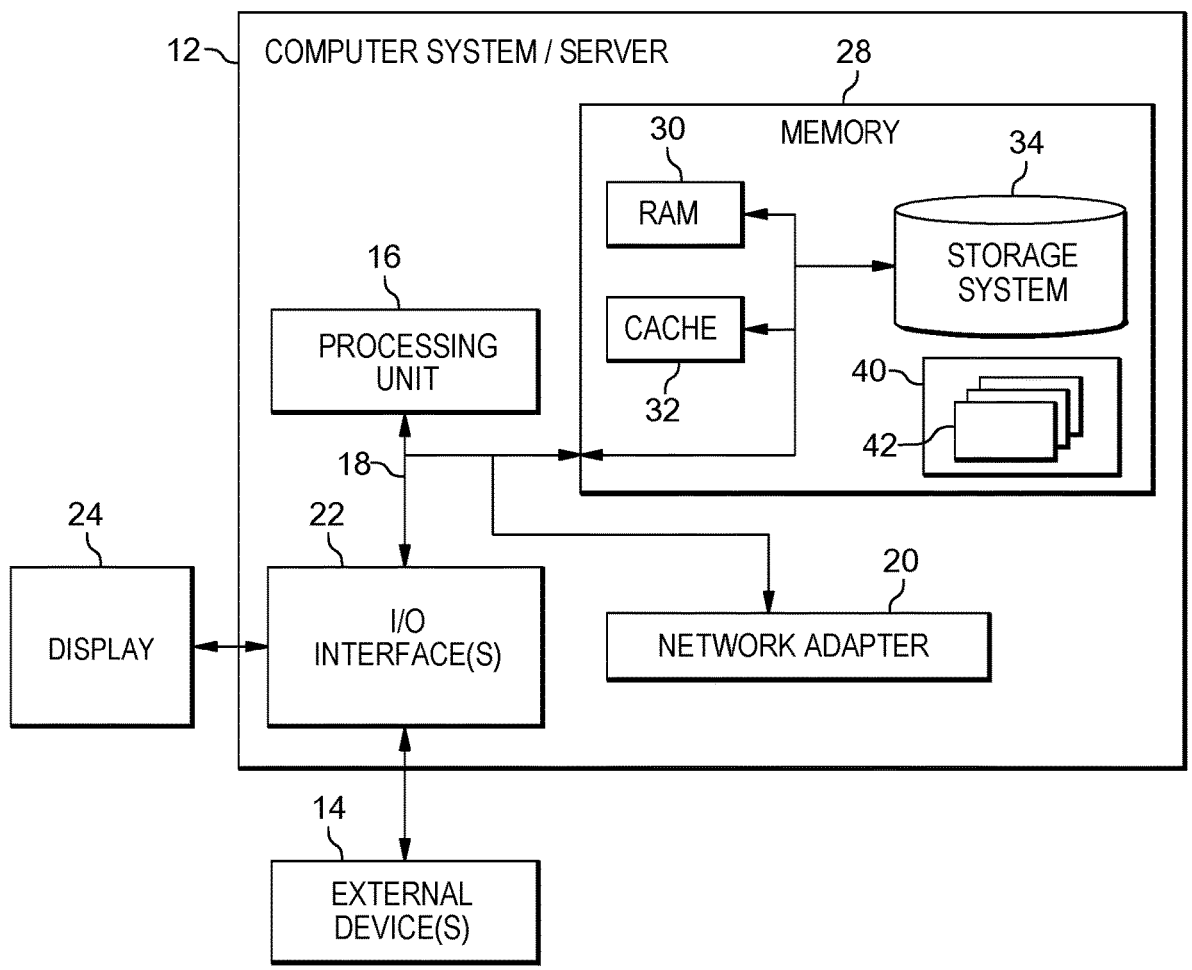
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program/utility 40, having a set (at least one) of program modules 42, may be stored in memory 28.

Embodiments of the present invention include a computer-implemented method, a computer program product, and a computing system where program code executing on one or more processors provide dynamic multilingual speech recognition (DMSR) management that enable the program code to both intelligently select as well as switch voice inputs in a multilingual voice input system. In embodiments of the present invention, the program code efficiently recognizes voice input in mixed languages. Based on recognizing these inputs, in embodiments of the present invention, the program code provides real-time translation from an initial language to a resultant language without the pre-configuration required in existing electronic translation techniques. In various embodiments of the present invention, the program code can: 1) define a framework for managing and controlling a speech input and recognition system in real time; 2) generate a multilingual data structure to identify and track multilingual switches; 3) obtain and process vocal inputs; and 4) provide voice recognition of requests from users. Multilingual switches, in linguistics, also referred to as code-switches (the act being code-switching), occur when a speaker alternates between two or more languages, or language varieties, in the context of a single conversation, or, in this case, an audio input. Embodiments of the present invention include program code that recognizes languages of the inputs by users, even when multiple languages are included and when shifts in input language are frequent, without the need for pre-configurations to provide this data. In embodiments of the present invention, a multilingual switch can include, but is not limited to, a service request, a translation request, any input method switch (e.g., switching an input method mode from a first language mode to a second language mode, including changing keyboard settings), and changes is default languages and/or locales (e.g., changes language priority settings on an application based on location).

Embodiments of the present invention include a computer-implemented method, a computer program product, and a computer system where program code executing on one or more processors monitors multilingual switches performed (manually and automatically) on a client, on behalf of a given user. The multilingual switches can include, but are not limited to, input and output requests (e.g., input method requests, translation requests, and/or, script layout and rendering requests etc.), but translation requests initiated by the client on behalf of the given user, comprise a portion of the multilingual switches. The translation requests, for example, can each includes a voice input stream and contextual data related to the voice input stream. The program code monitors the switches and identifies, based on the multilingual switches performed on the client, switch patterns of the given user and generates a service profile for the user. The service profile includes machine learned multilingual switch patterns for the given user. The program code determines, based on the machine learned multilingual switch patterns for the given user, a priority order for languages comprising the voice input streams, for the given user. The program code obtains a new translation request initiated by the client, on behalf of the given user and applies the priority order to identify one or more languages spoken in a voice input stream comprising the new translation request. The program code transmits indicators of the identified one or more languages to the client, where upon receiving the indicators, the client translates the voice input stream from the identified one or more languages to one or more target languages.

Various aspects of the present invention provide flexibility when the inputs (vocal, original) and outputs (varied in format, translated) in a multilingual technical environment, change. In embodiments of the present invention, the program code obtains multilingual voice input streams and tracks these inputs in order to identify and adapt, should either the prioritized input or the desired output change. For example, in some embodiments of the present invention, the program code receives multilingual voice input streams and: 1) dynamically identifies languages of vocal inputs; 2) generates a multilingual-aware voice input module switching algorithm, based on tracking and machine learning multilingual switch patterns for certain requests from certain users, and applies the algorithm to track multilingual switches for user; and 3) prioritizes language detection order according to the machine learned multilingual switch patterns.

Aspects of various embodiments of the present invention are inextricably tied to computing and provide significant advantages over existing translation approaches. As will be discussed in greater detail herein, embodiments of the present invention provide Dynamic Multilingual Speech Recognition (DMSR) by generating machine learning algorithms that enable program code executing on one or more processors to generate a DMSR Data Structure, Multilingual Identification Strategies, and/or a DMSR Switching Algorithm that provide multilingual speech recognition, with machine learning based dynamic configuration, rather than pre-configuration, to translate multilingual audio from a first language, to a second language, in real-time. The machine learning, which is a basis of the dynamic configuration, enabling the program code to recognize, dynamically, multilingual speech, is an aspect tied to computing. Additionally, one or more processors executing program code providing multilingual speech recognition and translation, in real-time, is another aspect tied to computing. In addition to being inextricably tied to computing, aspects of various embodiments of the present invention provide significant advantages over existing translation techniques because existing techniques cannot translate multilingual speech without being pre-configured to recognize each language, individually (in some instances, based on the presence of certain words or phrases in an audio input). This pre-configuration is cumbersome and limits the functionality of these solutions. Meanwhile, in embodiments of the present invention, program code dynamically recognizes multilingual speech (e.g., based on machine learning). In some existing techniques, a user sets a default language to enable speech recognition and translation, but in embodiments of the present invention, the program code can recognize a mix of languages, in an audio input, on the fly. As will be discussed in greater detail herein, in embodiments of the present invention, the program code provides real-time identification of languages for translation from voice inputs in mixed languages, without manual pre-configuration, by generating and utilizing a unique data structure, multilingual identification strategies, and one or more algorithms. In applying a learning-based dynamic configuration, the program code utilizes machine learning to determine the priorities of language choices when deciphering the language of a voice input; the program code learns which languages to try, and in what order (i.e., the program code intelligently selects and optimizes language identification priorities). In some embodiments of the present invention, the priorities are based on the origin of the audio (e.g., user, group, origin, destination, etc.). This dynamic learning and application is not available in existing techniques and for at least this reason, aspects of the present invention provide significantly more than existing translation techniques.

FIG. 1 is a workflow 100 that illustrates various aspects of some embodiments of the present invention. In an embodiments of the present invention, program code executing on one or more processors monitors multilingual switches for each service request (e.g., translation requests, other input and output requests) from each client (e.g., user, user group) (110). In some embodiments of the present invention, the program code tracks the switches, based on the monitoring, retaining raw data in a storage, such as a memory (120). In addition to tracking historical data regarding switching data related to multilingual audio streams provided to the program code by the client, the program code, in some embodiments of the present invention, monitors language usage on the client, including by a user, during usage of other applications on the client, including, but not limited to, web browsers, word processing programs, accounting programs, etc. For example, the program code can monitor languages utilized on a client by a user who launches a web browser. Additionally, the program code can monitor the location of the client and infer language preferences from changes in geographic location. The program code analyzes the tracked switch data for each client and machine learns multilingual switch patterns for each client (130). In some embodiments of the present invention, application usage data and geographic data can also be utilized in determining patterns for a given client. As part of this machine learning, the program code can learn the switch patterns (tendencies) associated with certain service requests from a certain user or user group. The program code prioritizes language detection order for the client (e.g., certain user or the user group) according to the learned multilingual switch patterns (140). The priorities refer to an order in which program code receiving spoken input from the client will try to recognize input from the user as being in various languages. For example, for a given client, the program code can attempt to recognize the input first, as English, and then, as Spanish. Based on applying the prioritization for input from a given client, the program code can determine the languages of a multilingual voice input stream from the client, in real time. Hence, when the program code receives a multilingual voice input streams from the client, the program code identifies the client (150) and based on identifying the client, the program code applies the learned switch patterns (e.g., multilingual-aware voice input module switching algorithms) to determine the languages of the multilingual voice input stream and translates the content of the stream, in real time (160).

As illustrated in FIG. 1, the program code effectively defines a framework for managing and controlling speech input and recognizing input, in real time, based on generating a data structure with multilingual awareness and utilizing the data structure for tracking multilingual switches associated with requests from specific users or groups of users. Thus, the program code generates user-specific frameworks and data structures based on utilizing dynamic multilingual identification strategies and generating, through machine learning, one or more multilingual-aware voice input module switching algorithms.

Figure 2:
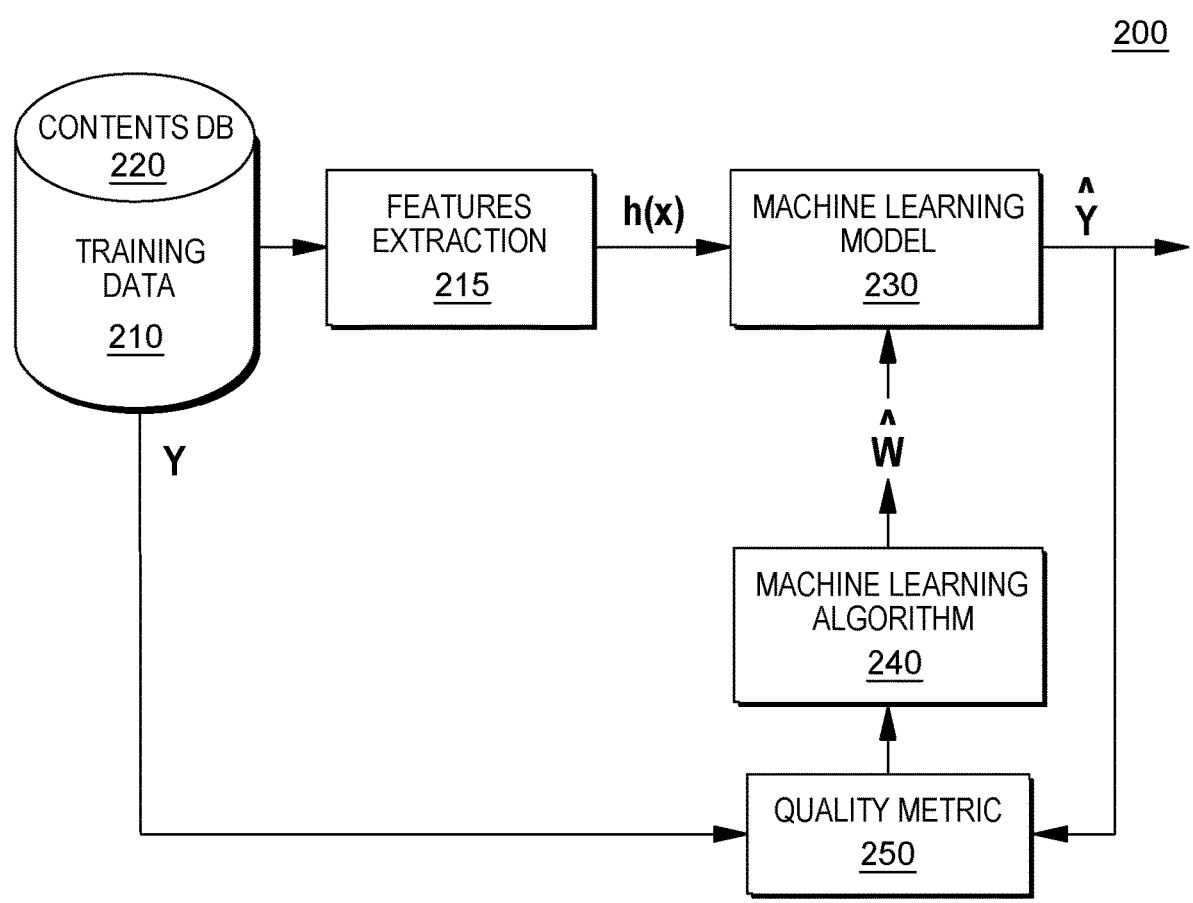
FIG. 2 is an illustration of various aspects of an embodiment of the present invention.

As aforementioned, the program code applies machine learning algorithms to model multilingual switch patterns for each client. The program code can train these algorithms, based on patterns for the client (or across all clients). FIG. 2 is an example of a machine learning training system 200 that can be utilized to perform cognitive analyses of multilingual switches for each translation request (e.g., service request) from each client to generate user-specific frameworks and data structures, including one or more multilingual-aware voice input module switching algorithms, for each client. Machine learning (ML) solves problems that cannot be solved by numerical means alone. In this ML-based example, program code extracts various features/attributes from training data 240 (e.g., monitored data, FIG. 1, 110), which may be resident in one or more databases 220 comprising switching patterns of various clients. The features are utilized to develop a predictor function, h(x), also referred to as a hypothesis, which the program code utilizes as a machine learning model 230. In identifying various switching patterns in the training data 210, the program code can utilize various techniques including, but not limited to, mutual information, which is an example of a method that can be utilized to identify features in an embodiment of the present invention. Further embodiments of the present invention utilize varying techniques to select features (elements, patterns, attributes, etc.), including but not limited to, diffusion mapping, principal component analysis, recursive feature elimination (a brute force approach to selecting features), and/or a Random Forest, to select the features. The program code may utilize a machine learning algorithm 240 to train the machine learning model 230 (e.g., the algorithms utilized by the program code), including providing weights for the conclusions, so that the program code can languages in multilingual input in accordance with the predictor functions that comprise the machine learning model 230. The conclusions may be evaluated by a quality metric 250. By selecting a diverse set of training data 210, the program code trains the machine learning model 230 to identify and weight various attributes (e.g., features, patterns) that correlate to various multilingual switches.

Figure 3:
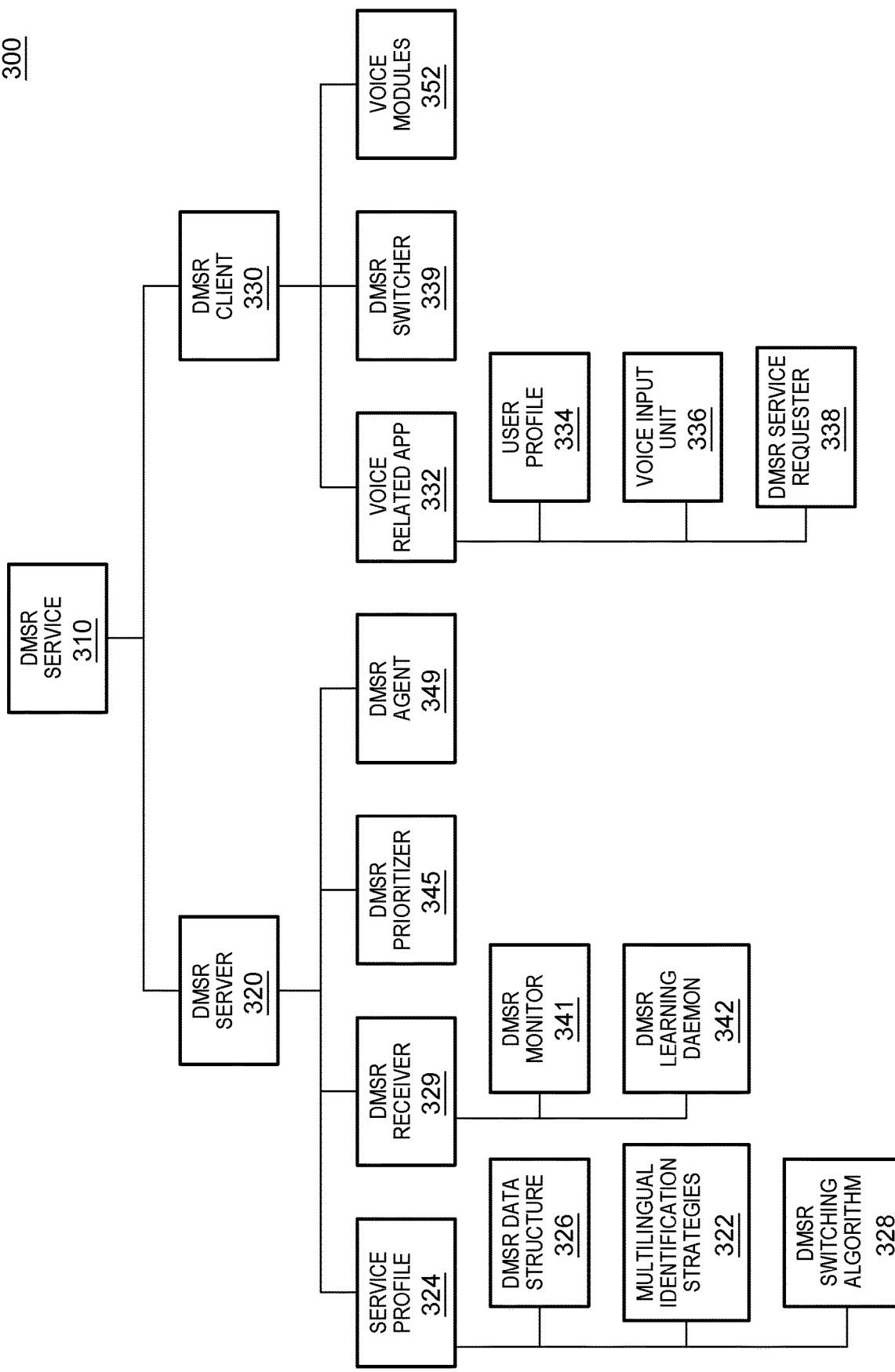
FIG. 3 is an illustration of various aspects of an embodiment of the present invention.

FIG. 3 illustrates various aspects 300 of some embodiments of a non-limiting example of an implementation of an embodiment of the present invention. The components illustrated in FIG. 3 include an example of a distribution of functionality and are provided for illustrative purposes only. As illustrated in FIG. 3, three primary components of some embodiments of the present invention include a dynamic multilingual speech recognition (DMSR) service 310, which includes communications and transmissions between a DMSR server 320, which receives requests for translations, and a DMSR client 330, which requests a translation and supplies a multilingual audio stream as input.

In some embodiments of the present invention, a DMSR client 330 comprises one or more computing devices and makes a service request, including but not limited to a translation request, to the DMSR service 310, such that the DMSR server 320 obtains and translates a multilingual audio stream, in real-time. The DMSR client 330 includes one or more voice related applications 332, which capture multilingual audio streams and issue a service request via a DMSR service requestor 338 in the applications 332, to the DMSR server 320. These applications 332, which utilize voice inputs may include various voice-prompted controls on the client 330, including but not limited to, Internet of Things (IoT) voice control applications. In order to receive vocal prompts on the DMSR client 330, the applications 332 include a user profile 334, which can comprise a file that is customized to a given user with customized multilingual switching rules. As a client 330 can be utilized by more than one user, a given client 330 can store more than one user profile 332. The applications 332 also include a voice input unit 336, at which a user issues a voice command (e.g., multilingual audio stream). The voice input unit 336 can comprise one or more of a voice sampling sensor, a microphone, and/or a camera sensor. Upon receiving an input at the voice input unit 336, the program code of the DMSR service requestor 338 issues a translation service request. The DMSR client 330 can also include a DMSR switcher 339 module for switching a voice input mode to a voice input module 352, according to an identified language stream, in real-time.

Requests from the DMSR service requestor 338 of the DMSR client 330 are received by a DMSR server 320, via a DMSR service 310. In some embodiments of the present invention, the DMSR server 320 executes program code on one or more processors. As discussed in FIG. 1, embodiments of the present invention generate algorithms for the individual (customized) management of translation requests on a client-by-client basis. To manage translation for a given client 330, in some embodiments of the present invention, the program code generates, updates, and applies, a service profile 324. The program code utilizes the service profile 324, which can be comprised of one or more files, to configure and customize DMSR services 310 for each client 330. In some embodiments of the present invention, the service profile 324 includes multilingual identification strategies 322, which include a set of rules for scoping and managing the DMSR services 310. Rules can include which context factor or factors are utilized by the program code to identify an input language and/or the origin of a request from a DMSR client 330. Other business rules in the multilingual identification strategies 322 can govern when and where modules for certain languages are enables or disabled, which voice related applications 332, when utilized by the client 330, have access to specific languages, and/or determines when to save client data in the service profile 324. As discussed in FIG. 1, embodiments of the present invention provide a customized language recognition based on client patterns. Data regarding these patterns and data utilized by the program code to generate these patterns can be retained by the program code in the service profile 324 for each client 330 as well as for each user and/or group of users, associated with a given client 330.

The context factor or factors utilized by the program code to identify an input language and/or the origin of a request from a DMSR client 330 can vary depending on the implementation and configuration of the illustrated aspects, as well as the results of the analysis of monitored data (e.g., FIG. 1, 110) by the analysis by the program code of switch data for the client 330, when the program code machine learns multilingual switch patterns for the client 330 (e.g., FIG. 1, 130). Contexts utilized by the program code can include, but are not limited to: changes in input methods from one language to another, browsing activity of the client 330, including views of webpages and sites in different languages, and/or utilization by the client 330 of applications in a changed geographic location. For example, based on monitoring client 330 activity, the program code determines that a User-1 of the client 330 utilizes App-1 in three different languages, Chinese, English, and Japanese, with a frequency of that order. Based on this data, the program code can prioritize the languages utilized by the client in the following order: 1) Chinese, 2) English, and 3) Japanese. The program code can establish a prioritized language list setting in the service profile 324 (e.g., PriorTizedLANGList (Chinese. English. Japanese)).

As illustrated in FIG. 3, the program code, in this example, executing on the DMSR server 320, generates and maintains a service profile 324 that can also include a DMSR data structure 326, which is a data structure for utilized by the program code to save and track multilingual switching operations for service requests from users, via clients 330. A portion of the data structure 326 can comprise the prioritized language list discussed above. In some embodiments of the present invention, a data structure for a given user, or user group can include a user identifier, an application identifier, and a prioritized language list (e.g., DMSR_Data (UserID, AppID, PriorTizedLANGList(first language, second language, third language)).

In some embodiments of the present invention, the data structure 326 can include various elements of a digital wardrobe of a given user or group or users (or a client 330) that the program code can cognitively analyze when establishing the service profile 324. As understood by one of skill in the art, a digital wardrobe is a collection of data that can be understood as a unique identifier for a user. A user's digital wardrobe is comprised of all hardware and software that a user interacts with. For example, not only is a user's digital wardrobe comprised of all physical computing devices a user may utilize (e.g., personal computing device, Internet of Things devices, sensors, personal health trackers, physical activity trackers, smart watches, digital thermostat, smart televisions, digital cameras, computerized exercise equipment, smart appliances, etc.), it is also comprised of any software a user utilizes (e.g., social media platforms, ecommerce applications, electronic media subscriptions, electronic media views, etc.). Because of the variety of devices and applications available, those of skill in the art accept that two individuals will not have the same digital wardrobe. Thus, an individual's digital wardrobe can be utilized as a unique identifier for the individual. In addition to identifying a user, data that comprises a digital wardrobe can be utilized to tailor additional applications, software, events, experiences, to fit the parameters and preferences to the user, based on extracting and analyzing this data from the user's digital wardrobe. In embodiments of the present invention, the program code can extract elements of a user's digital wardrobe to generate portions of the data structure 326.

Elements of a digital wardrobe for a given user of a client 330 can be accessed by the server 320, via the client 330, via communications with IoT devices. As understood by one of skill in the art, the Internet of Things (IoT) is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to an object, including but not limited to, temperature and humidity. The smart sensors can be utilized to measure temperature, humidity, vibrations, motion, light, pressure and/or altitude. IoT devices also include individual activity and fitness trackers, which include (wearable) devices or applications that include smart sensors for monitoring and tracking fitness-related metrics such as distance walked or run, calorie consumption, and in some cases heartbeat and quality of sleep and include smartwatches that are synced to a computer or smartphone for long-term data tracking. Because the smart sensors in IoT devices carry unique identifiers, a computing system that communicates with a given sensor (e.g., a personal computing device, the client 330) can identify the source of the information. Within the IoT, various devices can communicate with each other and can access data from sources available over various communication networks, including the Internet. Thus, based on communicating with the client 330, program code executing on the server 320 can obtain digital wardrobe data from the client 330, to configure the services 310 for the client 330, utilizing the service profile 324.

In some embodiments of the present invention, a service profile 324 for a user and/or client includes one or more DMSR switching algorithms 328 generated by the program code through machine learning. A switching algorithm 328 can be understood as an algorithm for managing and switching multiple voice input modules according to the multilingual identification strategies 322 (e.g., rules). The program code can utilize a switching algorithm 328 to manage the priorities of languages for a given user, user group, and/or client 330. For example, the program code can changes the priorities of a language list (PriorTizedLANGList) for a given user based on determining, via data obtained from monitoring the client 330, that a location of a user has changed (e.g., an IoT device of a user in communication with the client 330 can provide this data). The program code can obtain data indicating that a given user is in a restaurant that serves Chinese cuisine. The program code can obtain this data in a variety of ways based on the interconnectivity of computing devices, including but not limited to: 1) via location services on an IoT of the user in communication with the client 330; and/or 2) by monitoring usage of an application where the activity indicates that the user is browsing reviews of the restaurant). For a user with a prioritized list of English, Japanese, Chinese (e.g., PriorTizedLANGList(English, Japanese, Chinese)), based on obtaining this data, the program code can re-order the priorities to Chinese, English, Japanese, automatically (e.g., PriorTizedLANGList (Chinese, English, Japanese)), when determining that the user is utilizing a given application (e.g., a restaurant review application, App1), in a given location (e.g., a Chinese restaurant, Location). Thus, the program code utilizes a switching algorithm 328, based on a rule (e.g., App1+Location) from the multilingual identification strategies 322, to change the language priorities for a user of a client 330.

Expanding upon the example of the Chinese restaurant affecting the language priority order for a user, FIG. 4 is a table that provides an exemplary (non-limiting) list of (machine learned) rules (multilingual identification strategies 322) that can be utilized by the program code executing on the server 320 to manage prioritization with the switching algorithm 328. The Mixed Group column denotes the factors the program code determined coordinate with prioritization of, in this example, at least five language (e.g., English, Chinese, Japanese, Korean, Other), for a given user. In this example, one or more of general or distinct locations are combined with an application utilized by the user to generate a rule/priority order.

Returning to FIG. 3, as discussed above, the program code generates a server profile 324 for a given user based on obtaining data from a client 330. Some of the data utilized to generate the user profile is obtained by the program code of a DMSR receiver 329 module of a server 320. This module may comprise an application programming interface (API) and may be configures as software as a service (SaaS). The DMSR receiver 329 obtains multilingual voice identification requests via the DMSR service 310, from the client 330. As illustrated in FIG. 1, service requests are received, monitored, and analyzed, by the program code. Thus, the DMSR receiver 329 includes: 1) a DMSR monitor 341 with program code (e.g., a module) to track multilingual switching operations for each service request from each user (or user group or client 330); and 2) a DMSR learning daemon 342 with program code (e.g., a module) for learning multilingual switch patterns for certain service requests from certain users (or user group or clients 330). Learned multilingual switch patterns include, but are not limited to, operations and contexts (e.g., a user changing input methods from one language to another, a user browsing webpages and sites in different languages, a user using certain applications in a changed geographic location) that can be tracked and analyzed by the program code utilizing machine learning algorithms, in order to learn relevant multilingual switch patterns. FIG. 4 includes various examples of learned multilingual switch patterns in the Mixed Group column.

Referring to FIG. 4, the data displayed in an example of data that can be obtained by the DMSR receiver 329 (FIG. 3), through monitoring by the DMSR monitor 341 (FIG. 3) and the DMSR learning daemon 342 (FIG. 3) can utilize the data to learn multilingual switch patterns. Per the example data in FIG. 4, language usage frequency of a user, User-1, on a given application, App-1, in order of frequency from greatest to least, is Chinese, then English, then Japanese (Korean and Other are not utilized with any frequency).

Returning to FIGS. 3-4, in an embodiment of the present invention, program code of the DMSR learning daemon 342 can analyze the statistics discovered through monitoring the generate a switch pattern for the user for application App-1, which is PriorTizedLANGList(Chinese, English. Japanese). The prioritization of the languages can be accomplished by program code in a DMSR prioritizer 345 module of the DMSR server 320. This program code prioritizes language detection order according to the multilingual switch patterns. This program code performs an operation to set the order of language recognition attempted by the program code upon obtaining mixed language input according the learned user's operations. Program code of a DMSR agent 349 executing on the DMSR server 320 identifies languages from the DMSR client 330 in a mixed voice input stream, according to the prioritized language list (prioritized by the DMSR prioritizer 345).

Together, FIG. 4 and FIG. 3 illustrate how program code of a DMSR prioritizer 345 in embodiments of the present invention prioritizes the language recognition selection for different applications 332 (executing on the client 330, sending translation requests to the server 320, via a DMSR service requestors 338 in the applications 332), based on learned a user's operation pattern, as identified in monitored data (e.g., FIG. 4). In some embodiments of the present invention, based on one or more of the DMSR data structure 326 (e.g., DMSR_Data (UserID, AppID, PriorTizedLANG-List(first language, second language, third language . . . )), multilingual identification strategies 322, and switching algorithm, the program code of the DMSR prioritizer 345 sets default priorities for User-1, App-1 as: DMSR_Data (User-1, App-1, PriorTizedLANGList(English. Chinese, Japanese). Based on determining, by program code of the DMSR learning daemon 342 that the location of the user, User-1, is an attribute that is determinative of the language priorities (based on collected data), when the user, User-1, utilizes the application, App-1, the program code generates data structures that are location-based for the user. For example, for Location-1 (i.e., when the user is present at this location) the program code sets an order of: DMSR_Data (User-1, App-1, PriorTizedLANGList(Chinese, English. Japanese). For a second location, Location-2, the program code sets the following order: DMSR_Data (User-1, App-1, PriorTizedLANGList(Chinese, English. Japanese). For a third location, Location-3, the program code sets the following order: (User-1, App-1, PriorTizedLANGList(Chinese, English. Japanese). Based on these individual priorities the DMSR prioritizer 345 can set a language recognition selection order of Chinese, then, English, and then, Japanese, for any location.

As illustrated in the data of FIG. 4 and the aspects of FIG. 3, should the user, User-1, utilize a second application, App-2, the priorities can change. In one example, for User-1, App-2, the program code sets a default order: DMSR_Data (User-1, App-2, PriorTizedLANGList(Japanese). This order indicates that should a request originate from App-2 of the applications 332, the only language the program code should attempt is Japanese. When the program code determines, through machine-learning, that location is a context that affects language priorities, based on this determination, the program code sets the DMSR data structures 326 in a service profile 324 for the user, User-1, as follows: for a location of Location-4, DMSR_Data (User-1, App-2, PriorTizedLANGList(Japanese, English, Chinese) (because Japanese=English=0.4, and Chinese=0.2), for a location of Location-5, DMSR_Data (User-1, App-2, PriorTizedLANGList(Japanese, Chinese, English)(because Japanese=Chinese=0.4, and English=0.2), for a location of Location-6, DMSR_Data (User-1, App-2, PriorTizedLANGList(Korean, English) (because Korean=0.6, and English=0.4).

Based on the data structures established above, the program code (e.g., the DMSR prioritizer 345) can establish location and application-based language prioritization orders for the user, User-1. The order dictates for which requests (from what applications), for what user (or group), and in this case, at what locations, the order in which certain languages should be applied to received audio streams. Translation itself can be handled by external or internal translation engines. Thus, the order provides the program code with the order of the language engines to which the received streams should be provided, for translation. Based on the data in FIG. 4, the program code sets, for User-1 and App-2 in Location-4, the language recognition selection order as: 1) Japanese, 2) English, and 3) Chinese. For User-1 and App-2 in location-5, the program code sets the language recognition selection order as: 1) Japanese, 2) Chinese, and 3) English. For User-1 and App-2 at Location-6, the program code sets the language recognition selection order as: 1) Korean, and 2) English.

Figure 5:
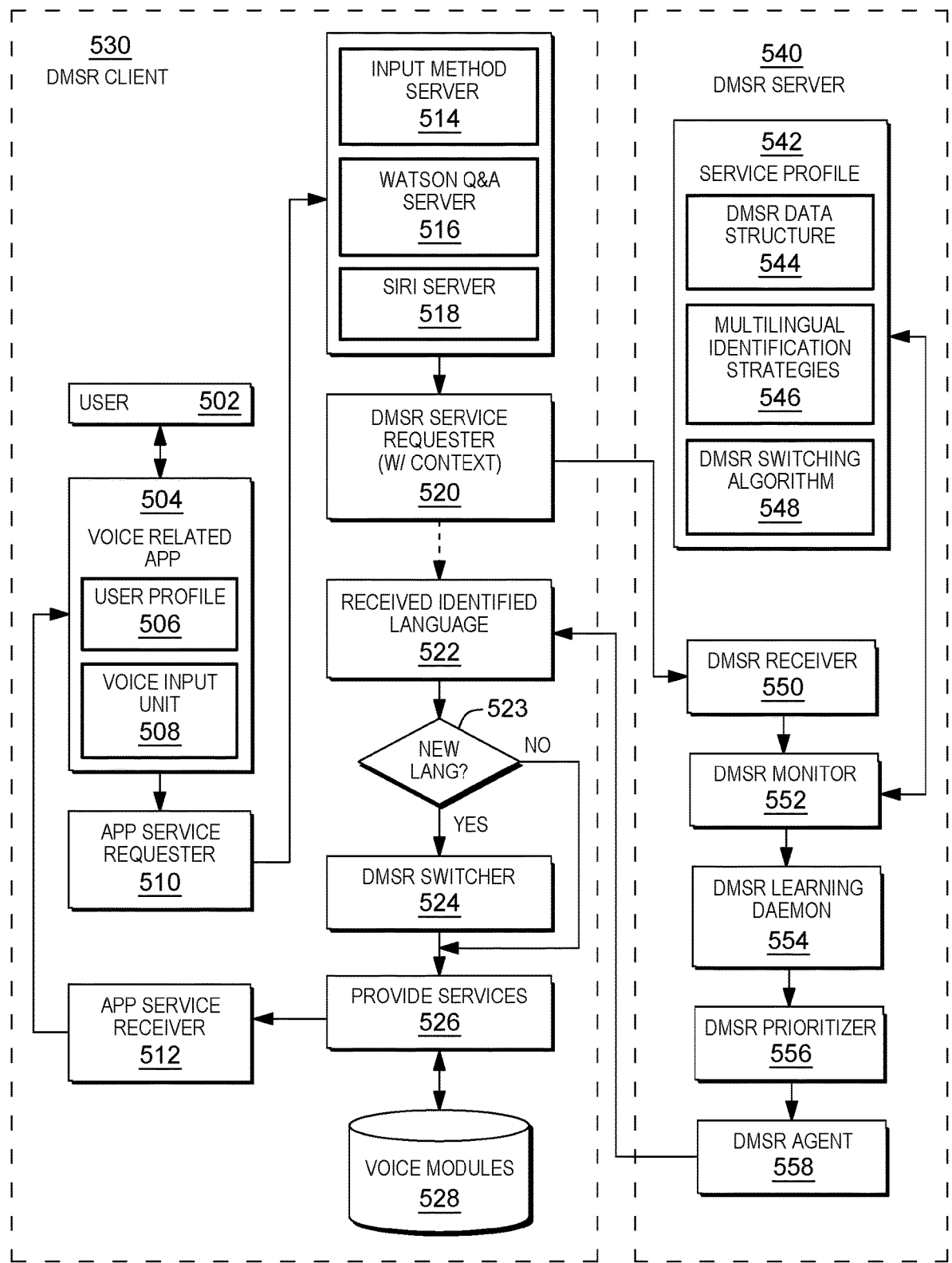
FIG. 5 is an illustration of various aspects of an embodiment of the present invention.

FIG. 5 provides a more detailed illustration 500 that depicts both components of embodiments of the present invention in addition to aspects of the interactions between these components. In general, FIG. 5 depicts components and functional aspects of a DMSR client 530 (e.g., FIG. 3, 330) and a DMSR Server 540 (e.g., FIG. 3, 320) in some embodiments of the present invention. FIG. 5 also illustrates how various existing solutions can be integrated into embodiments of the present invention to provide certain distinct functionalities. In some embodiments of the present invention, at a DMSR client 530, a user 502 provides audio input (i.e., a mixed voice input stream) to a voice related application 504 executing on one or more processors of the DMSR client 530 (or accessible at the DMSR client 530 as a service and executed elsewhere, including but not limited to, on the DMSR server 540). The voice related application 504, which obtains the input, can include both a user profile 506 and a voice input unit 508. The voice input unit 508 obtains the input, while the user profile 506 attempts to identify the user 502 who provided the input and also provides information about the user 502 to aid in translation of the audio provided.

In an embodiment of the present invention, based on obtaining audio input at voice related application 540 on the DMSR client 530, the program code on the DMSR client 530 calls for one or more services, via an application service requestor 510, that leverage the services provided by the DMSR server 540, including providing assistance in identifying the language of input and providing context, which the DMSR server 540 can utilize to assist in translating the audio more efficiently (and correctly). The data provided by the existing services executing at the DMSR client 530 can be utilized in embodiments of the present invention to supplement the determinations of the one or more programs executing on the DMSR server 540. For example, in some embodiments of the present invention, the program code of these existing programs, which in this example include an input method server 514, the IBM Watson® Application Program Interface (API), and a Siri Server 518. IBM Watson® is a product of International Business Machines Corporation. IBM Watson® is a registered trademark of International Business Machines Corporation, Armonk, N.Y., US. In embodiments of the present invention, the program code of the DMSR client 530 interfaces with IBM Watson® APIs to perform a cognitive analysis of intermediate data, in some embodiments of the present invention, the program code interfaces with the application programming interfaces (APIs) that are part of a known cognitive agent, such as the IBM Watson® Application Program Interface (API), a product of International Business Machines Corporation, to identify aspects of a service request. IBM Watson® is a registered trademark of International Business Machines Corporation, Armonk, N.Y., US.

In embodiments of the present invention, certain of the APIs of the IBM Watson® Application Program Interface (API) comprise a cognitive agent that includes one or more programs, including, but are not limited to, natural language classifiers, Retrieve and Rank (i.e., a service available through the IBM Watson® Developer Cloud that can surface the most relevant information from a collection of documents), concepts/visual insights, trade off analytics, document conversion, and/or relationship extraction. In an embodiment of the present invention, one or more programs analyze the audio utilizing one or more of a natural language classifier, retrieve and rank APIs, and trade off analytics APIs. The IBM Watson® Application Program Interface (API) 516 can also provide multiple audio-related API services, which can be utilized by the program code, including but not limited to natural language processing, text to speech capabilities, and/or translation.

Thus, in embodiments of the present invention, before calling the DMSR server 540, the program code provides context to the audio input. In some embodiments of the present invention, the program code utilizes the speech input and translation tools of one or more of the Sir Server 518 and/or the IBM Watson® Application Program Interface (API) 516. (These two input tools are offered merely as examples of existing tools which can be utilized in various embodiments of the present invention.) Upon providing the context, the program code can request the DMSR service 520, by transmitting a request to the DMSR receiver 550 of the DMSR server 540, with the context. In some embodiments of the present invention, where no context is added, the program code transmits the request without the context. As discussed in reference to FIG. 3, the program code can utilize the context to generate and/or update a service profile 552 (e.g., FIG. 3, 324).

In some embodiments of the present invention, the program code of the DMSR server 540 obtains the request from the DMSR client 530, at a DMSR receiver 550. The DMSR receiver provides the request and context to a DMSR monitor 552 (e.g., FIG. 3, 341) and the program code of the monitor 552 tracks multilingual switching operations for the service request. The DMSR monitor 552 can identify and access a service profile 542, which, as discussed in FIG. 3, can include: 1) a data structure 544 (e.g., an identifier for a given user or user group, an application identifier, and a prioritized language list); 2) multilingual identification strategies 546 (e.g., a set of rules for scoping and managing the DMSR services, which can include which context factor or factors are utilized by the program code to identify an input language and/or the origin of a request from the DMSR client 530); and 3) a DMSR switching algorithm 548 (for managing and switching multiple voice input modules according to the multilingual identification strategies 546 based on managing the priorities of languages for a given user, user group, and/or client).

The program code of the DMSR monitor 552 provides the relevant data from the service profile 542 of the user 502 to the DMSR learning daemon 554, which, based on the service profile of the user 502, learns multilingual switch patterns for requests from this user 502. Based on individual priorities indicated by the service profile of the user 502, the DMSR prioritizer 556 sets a language recognition selection order for requests for the user 502 that are made with the given context. The program code of the DMSR agent 558 executing on the DMSR server 540 identifies languages from the DMSR client 530 in the original input (i.e., a mixed voice input stream), according to the prioritized language list (prioritized by the DMSR prioritizer 556).

One or more programs 522 executing on the DMSR client 530 receive the identifier input language from the DMSR agent 558 executing on the DMSR server 540. (As noted in FIG. 5, in another embodiment of the present invention, the components of the DMSR server 540 utilized to determine the input language of the audio can execute on the DMSR client 530 as a standalone process. In this case, the functionality of the DMSR server 540 is executed internally on the DMSR client 530 and the receipt of the language determination and the determination itself are internal.) Program code 524 (e.g., of the DMSR client 530) determines if the identified language is a new language (meaning that the DMSR client 530 can access existing translation services to translate the audio. If the language is not new, the program code accesses translation services 526, which translate the audio, providing the results to the user 502 via one or more of a voice module 528 and/or the voice related application 504, via an application service receiver 512. If the program code determined that the identified language is a new language, the program code utilizes a DMSR switcher 524 to locate services 526, which can be utilized to provide the translation. The program code provides the translation in real-time.

Embodiments of the present invention include a computer-implemented method, a computer program product, and a computer system where program code executing on one or more processors monitors multilingual switches performed on a client on behalf of a given user, wherein service requests initiated by the client on behalf of the given user comprise a portion of the multilingual switches, wherein translation requests comprise a portion of the service requests, and wherein the translation requests each comprise a voice input stream and contextual data related to the voice input stream. Based on the monitoring, the program code identifies, based on the multilingual switches performed on the client, switch patterns of the given user to generate a service profile for the user, wherein the service profile comprises machine learned multilingual switch patterns for the given user. The program code determines, based on the machine learned multilingual switch patterns for the given user, a priority order for languages comprising the voice input streams, for the given user. The program code obtains a new translation request initiated by the client, on behalf of the given user. The program code applies the priority order to identify one or more languages spoken in a voice input stream comprising the new translation request. The program code transmits indicators of the identified one or more languages to the client, wherein upon receiving the indicators, the client translates the voice input stream from the identified one or more languages to one or more target languages.

In some embodiments of the present invention, the given user is selected from the group consisting of: an individual user and a group of users.

In some embodiments of the present invention, identifying switch patterns of the given user to generate the service profile for the user further comprises: the program code identifying, for the monitored translation requests, dependencies between factors in the contexts of the translation requests and input languages of the voice input streams of the translation requests; and the program code generating a set of rules representing the identified dependencies, wherein the machine learned multilingual switch patterns comprise the set of rules.

In some embodiments of the present invention, the contexts of each request of the requests are selected from the group consisting of: an entry application for the request on the client, a location of a client upon entry of the request, and an element of a digital wardrobe of the client.

In some embodiments of the present invention, the contexts of each request of the requests are selected from the group consisting of: the given user changing input methods from one language to another, the given user browsing web-enabled interfaces in different languages, and the given user using one or more applications in a given geographic location.

In some embodiments of the present invention, the monitoring further comprises: the program code generating based on an initial translation request from the client of the translation requests from the client, a data structure; and the program code applying the data structure to subsequent translation requests from the client of the translation requests from the client, wherein applying the data structure tracks multilingual switching operations for the translation requests from the client.

In some embodiments of the present invention, the client translates the voice input stream comprising the new request in real-time.

In some embodiments of the present invention, the multilingual switches further comprise activities performed by the given user by utilizing applications executing on the client. In some embodiments of the present invention, the activities are selected from the group consisting of: usage of the given user of a web browser, usage of the given user of a word processing programs, and usage of the given user of an accounting programs.

In some embodiments of the present invention, obtaining the new translation request initiated by the client further comprises: the program code identifying the given user as an initiator of the new translation request.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention DMSR client 530 (FIG. 5) and DMSR server 540 (FIG. 5) can each be understood as a cloud computing node 10 (FIG. 6) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
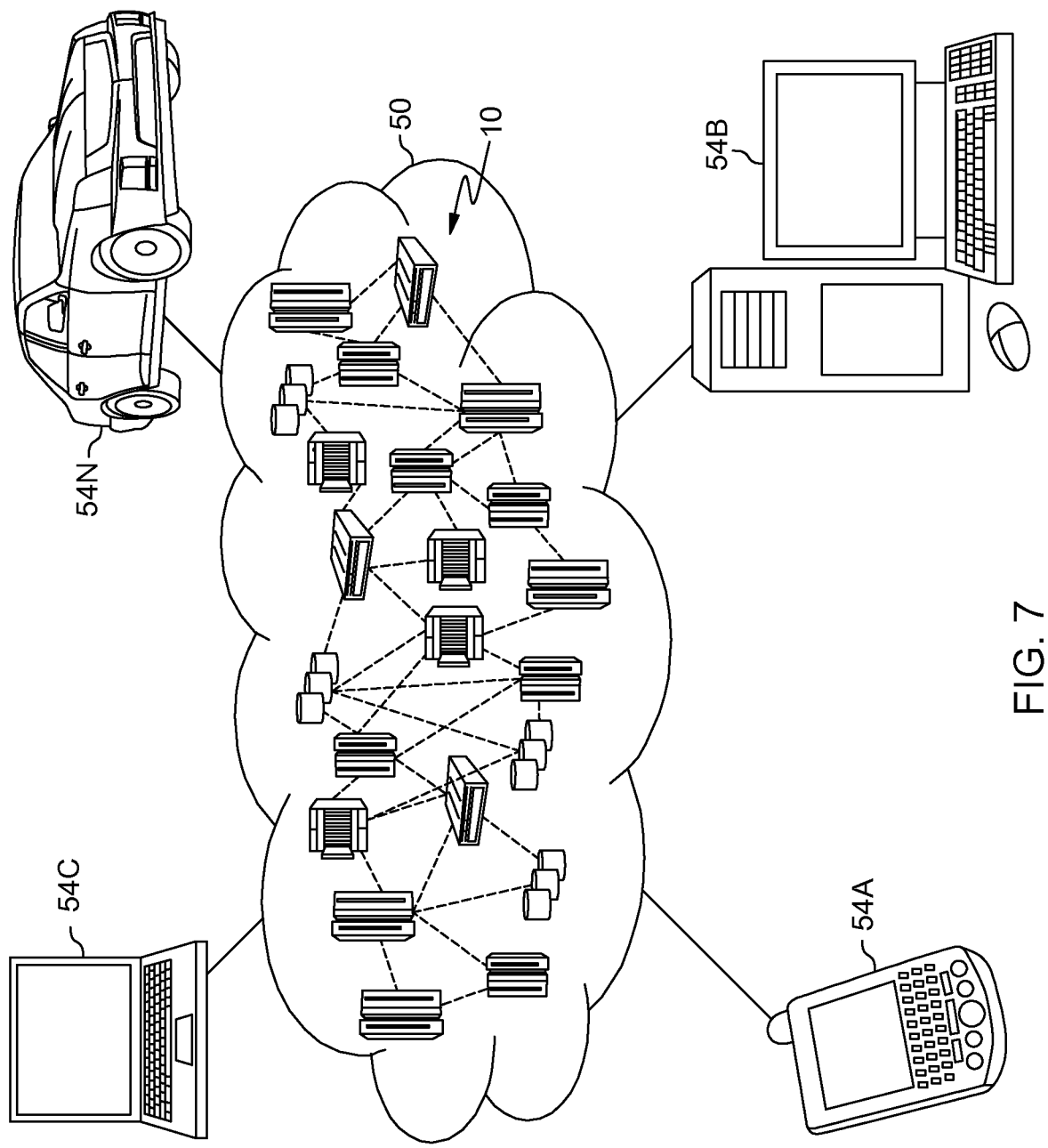
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
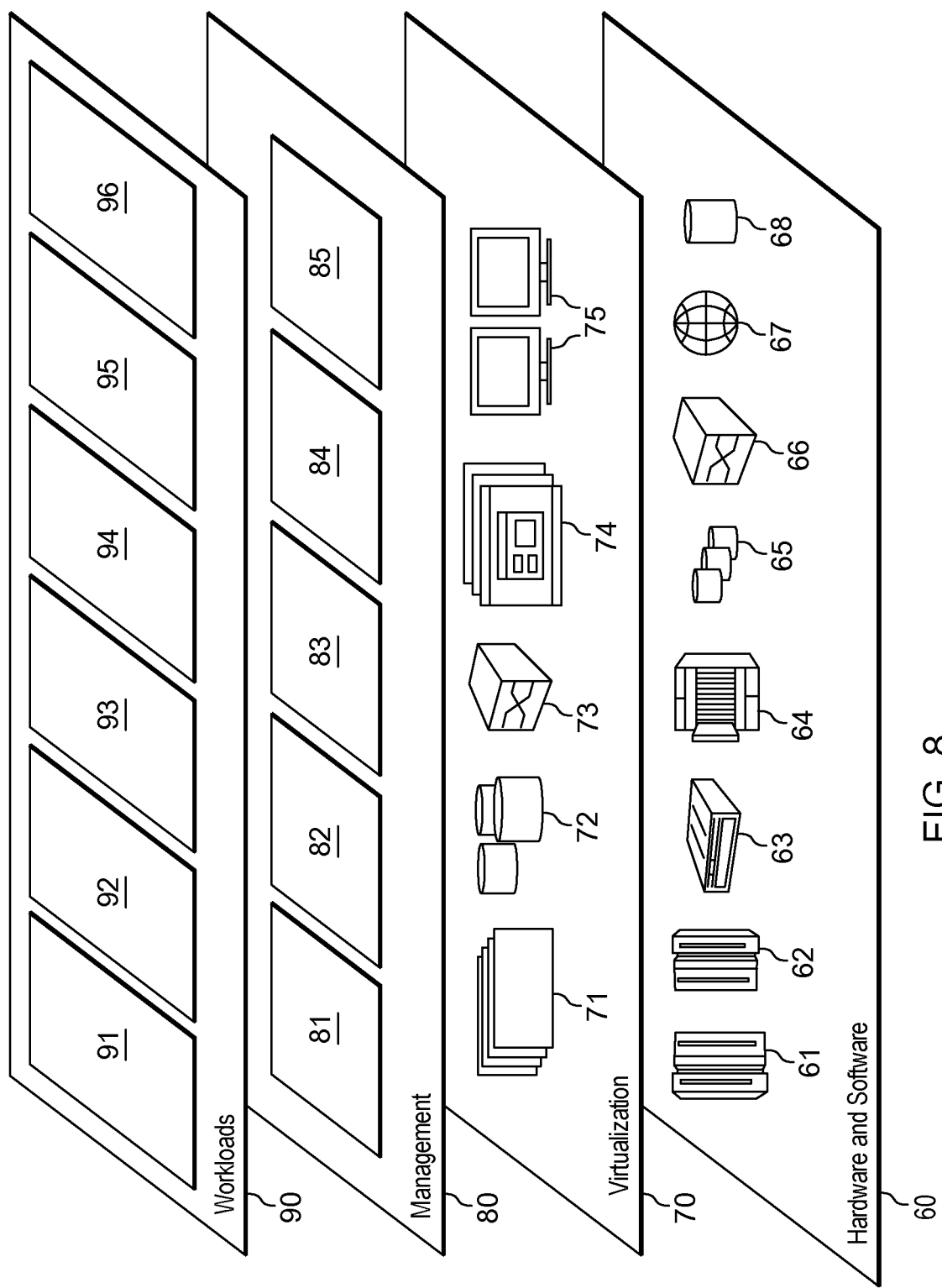
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and efficiently recognizing voice input in mixed languages 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    monitoring, by one or more processors, multilingual switches performed on a client on behalf of a given user, wherein service requests initiated by the client on behalf of the given user comprise a portion of the multilingual switches, wherein translation requests comprise a portion of the service requests, and wherein the translation requests each comprise a voice input stream and contextual data related to the voice input stream;
    based on the monitoring, identifying, by the one or more processors, based on the multilingual switches performed on the client, switch patterns of the given user to generate a service profile for the user, wherein the service profile comprises machine learned multilingual switch patterns for the given user;
    determining, by the one or more processors, based on the machine learned multilingual switch patterns for the given user, a priority order for languages comprising the voice input streams, for the given user;
    obtaining, by the one or more processors, a new translation request initiated by the client, on behalf of the given user;
    applying, by the one or more processors, the priority order to identify one or more languages spoken in a voice input stream comprising the new translation request; and
    transmitting, by the one or more processors, indicators of the identified one or more languages to the client, wherein upon receiving the indicators, the client translates the voice input stream from the identified one or more languages to one or more target languages.

2. The computer-implemented method of claim 1, wherein the given user is selected from the group consisting of: an individual user and a group of users.

3. The computer-implemented method of claim 1, wherein identifying switch patterns of the given user to generate the service profile for the user further comprises:
    identifying, by the one or more processors, for the monitored translation requests, dependencies between factors in the contexts of the translation requests and input languages of the voice input streams of the translation requests; and
    generating, by the one or more processors, a set of rules representing the identified dependencies, wherein the machine learned multilingual switch patterns comprise the set of rules.

4. The computer implemented method of claim 1, wherein the contexts of each request of the requests are selected from the group consisting of: an entry application for the request on the client, a location of a client upon entry of the request, and an element of a digital wardrobe of the client.

5. The computer implemented method of claim 1, wherein the contexts of each request of the requests are selected from the group consisting of: the given user changing input methods from one language to another, the given user browsing web-enabled interfaces in different languages, and the given user using one or more applications in a given geographic location.

6. The computer-implemented method of claim 1, wherein the monitoring further comprises:
    generating, by the one or more processors, based on an initial translation request from the client of the translation requests from the client, a data structure; and
    applying, by the one or more processors, the data structure to subsequent translation requests from the client of the translation requests from the client, wherein applying the data structure tracks multilingual switching operations for the translation requests from the client.

7. The computer-implemented method of claim 1, wherein the client translates the voice input stream comprising the new request in real-time.

8. The computer-implemented method of claim 1, wherein the multilingual switches further comprise activities performed by the given user by utilizing applications executing on the client.

9. The computer-implemented method of claim 8, wherein the activities are selected from the group consisting of: usage of the given user of a web browser, usage of the given user of a word processing programs, and usage of the given user of an accounting programs.

10. The computer-implemented method of claim 1, wherein the obtaining the new translation request initiated by the client further comprises:
identifying, by the one or more processors, the given user as an initiator of the new translation request.

11. A computer program product comprising:
a computer readable storage medium readable by one or more processors and storing instructions for execution by the one or more processors for performing a method comprising:
monitoring, by the one or more processors, multilingual switches performed on a client on behalf of a given user, wherein service requests initiated by the client on behalf of the given user comprise a portion of the multilingual switches, wherein translation requests comprise a portion of the service requests, and wherein the translation requests each comprise a voice input stream and contextual data related to the voice input stream;
based on the monitoring, identifying, by the one or more processors, based on the multilingual switches performed on the client, switch patterns of the given user to generate a service profile for the user, wherein the service profile comprises machine learned multilingual switch patterns for the given user;
determining, by the one or more processors, based on the machine learned multilingual switch patterns for the given user, a priority order for languages comprising the voice input streams, for the given user;
obtaining, by the one or more processors, a new translation request initiated by the client, on behalf of the given user;
applying, by the one or more processors, the priority order to identify one or more languages spoken in a voice input stream comprising the new translation request; and
transmitting, by the one or more processors, indicators of the identified one or more languages to the client, wherein upon receiving the indicators, the client translates the voice input stream from the identified one or more languages to one or more target languages.

12. The computer program product of claim 11, wherein the multilingual switches further comprise activities performed by the given user by utilizing applications executing on the client.

13. The computer program product of claim 12, wherein the activities are selected from the group consisting of: usage of the given user of a web browser, usage of the given user of a word processing programs, and usage of the given user of an accounting programs.

14. The computer program product of claim 11, wherein the client translates the voice input stream comprising the new request in real-time.

15. The computer program product of claim 11, wherein the given user is selected from the group consisting of: an individual user and a group of users.

16. The computer program product of claim 11, wherein identifying switch patterns of the given user to generate the service profile for the user further comprises:
identifying, by the one or more processors, for the monitored translation requests, dependencies between factors in the contexts of the translation requests and input languages of the voice input streams of the translation requests; and
generating, by the one or more processors, a set of rules representing the identified dependencies, wherein the machine learned multilingual switch patterns comprise the set of rules.

17. The computer program product of claim 11, wherein the contexts of each request of the requests are selected from the group consisting of: an entry application for the request on the client, a location of a client upon entry of the request, and an element of a digital wardrobe of the client.

18. The computer program product of claim 11, wherein the contexts of each request of the requests are selected from the group consisting of: the given user changing input methods from one language to another, the given user browsing web-enabled interfaces in different languages, and the given user using one or more applications in a given geographic location.

19. The computer program product of claim 11, wherein the monitoring further comprises:
generating, by the one or more processors, based on an initial translation request from the client of the translation requests from the client, a data structure; and
applying, by the one or more processors, the data structure to subsequent translation requests from the client of the translation requests from the client, wherein applying the data structure tracks multilingual switching operations for the translation requests from the client.

20. A system comprising:
a memory;
one or more processors in communication with the memory;
program instructions executable by the one or more processors via the memory to perform a method, the method comprising:
monitoring, by the one or more processors, multilingual switches performed on a client on behalf of a given user, wherein service requests initiated by the client on behalf of the given user comprise a portion of the multilingual switches, wherein translation requests comprise a portion of the service requests, and wherein the translation requests each comprise a voice input stream and contextual data related to the voice input stream;
based on the monitoring, identifying, by the one or more processors, based on the multilingual switches performed on the client, switch patterns of the given user to generate a service profile for the user, wherein the service profile comprises machine learned multilingual switch patterns for the given user;
determining, by the one or more processors, based on the machine learned multilingual switch patterns for the given user, a priority order for languages comprising the voice input streams, for the given user;
obtaining, by the one or more processors, a new translation request initiated by the client, on behalf of the given user;

applying, by the one or more processors, the priority order to identify one or more languages spoken in a voice input stream comprising the new translation request; and transmitting, by the one or more processors, indicators of the identified one or more languages to the client, wherein upon receiving the indicators, the client translates the voice input stream from the identified one or more languages to one or more target languages.

* * * * *